United States Patent
Sugimoto

(10) Patent No.: US 10,345,513 B2
(45) Date of Patent: Jul. 9, 2019

(54) DISPLAY DEVICE

(71) Applicant: SAKAI DISPLAY PRODUCTS CORPORATION, Sakai-shi, Osaka (JP)

(72) Inventor: Arimasa Sugimoto, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/755,973

(22) PCT Filed: Aug. 31, 2015

(86) PCT No.: PCT/JP2015/074804
§ 371 (c)(1),
(2) Date: Feb. 27, 2018

(87) PCT Pub. No.: WO2017/037855
PCT Pub. Date: Mar. 9, 2017

(65) Prior Publication Data
US 2019/0041571 A1 Feb. 7, 2019

(51) Int. Cl.
*F21V 8/00* (2006.01)
*G02F 1/1333* (2006.01)

(52) U.S. Cl.
CPC ......... *G02B 6/0088* (2013.01); *G02F 1/1333* (2013.01); *G02F 1/133308* (2013.01)

(58) Field of Classification Search
CPC .................. G02B 6/0088; G02F 1/133308
See application file for complete search history.

(56) References Cited

U.S. PATENT DOCUMENTS

| 2006/0147175 | A1 | 7/2006 | Shinohara |
| 2008/0137002 | A1 | 6/2008 | Takata |
| 2009/0174996 | A1* | 7/2009 | Park ..................... H05K 5/0017 361/679.21 |

FOREIGN PATENT DOCUMENTS

| JP | 2004125964 A | 4/2004 |
| JP | 2006190521 A | 7/2006 |
| WO | 2007026454 A1 | 3/2007 |
| WO | 2015037404 A1 | 9/2015 |

OTHER PUBLICATIONS

ISR issued in Int'l. App. No. PCT/JP2015/074804, dated Nov. 17, 2015.

* cited by examiner

*Primary Examiner* — David V Bruce
(74) *Attorney, Agent, or Firm* — Greer Burns & Crain, Ltd.

(57) ABSTRACT

A display device is capable of preventing light that is incident from a light guide plate from leaking through a gap between optical sheets and an optical-sheet holding member. The optical sheets include a plurality of sheet units. A storage unit for storing the flanges of the optical sheets has a sub-storage unit for storing the flanges of some sheet units. The flange of the other sheet unit excluded from the aforementioned some sheet units is larger than the sub-storage unit. When the flanges of the some sheet units are stored in the sub-storage unit, the flange of the other sheet unit is stored in the storage unit so as to cover the sub-storage unit and the some sheet units.

6 Claims, 7 Drawing Sheets

DISPLAY DEVICE

This is a National Phase Application filed under 35 U.S.C. § 371, of International Application No. PCT/JP2015/074804, filed Aug. 31, 2015, the contents of which are incorporated by reference.

TECHNICAL FIELD

The present invention relates to a display apparatus including an optical sheet that is placed on a light guide plate and includes a flange extending in a plane thereof from an edge thereof, and a holding member including an accommodation portion that accommodates the flange and holding the optical sheet.

BACKGROUND ART

Recently, so-called thin display apparatuses including a liquid crystal display panel are in a wide use. For such a display apparatus, various modifications have been made to decrease the width of a frame outside the display screen.

For example, Patent Document 1 discloses the following display apparatus. This display apparatus is configured such that an optical sheet is positioned by a panel support portion that supports a display panel. In this manner, light incident on the display panel after passing the optical sheet does not easily become uneven, and there is no need to separately provide another portion to support the display panel in addition to the portion positioning the optical sheet. Thus, the width of the frame is further decreased.

CITATION LIST

Patent Literature

Patent Document 1: WO2015/037404

SUMMARY OF INVENTION

Technical Problem

In a display apparatus having a structure that uses a panel support portion as described above, the panel support portion is provided between a light guide plate and an optical sheet, and supports peripheral edges of the light guide plate and the optical sheet. Therefore, light does not leak through peripheral edges thereof.

In the meantime, there are many structures in which the panel support portion is not provided between the light guide plate and the optical sheet in order to decrease the thickness. In such a structure, the light guide plate and the optical sheet contact each other, and light may leak through the peripheral edges thereof. However, this problem is not considered for the display apparatus disclosed in Patent Document 1.

The present invention made in light of such a situation has an object of providing a display apparatus including an optical sheet placed on a light guide plate, the optical sheet including a flange extending in a plane thereof from an edge thereof, and also including a holding member including an accommodation portion that accommodating the flange, the holding member holding the optical sheet, the display apparatus preventing light coming through the light guide plate from leaking through a gap between the optical sheet and the holding member.

Solution to Problem

A display apparatus according to the present invention includes an optical sheet placed on a light guide plate, the optical sheet including a flange extending in a plane thereof from an edge thereof; and a holding member including an accommodation portion accommodating the flange, the holding member holding the optical sheet. The optical sheet includes a plurality of unit sheets; the accommodation portion includes a part accommodation portion accommodating a flange of a part of the plurality of unit sheets; and the flange of the other of the plurality of unit sheets than the part of the plurality of unit sheets is larger than the part accommodation portion.

According to the present invention, the flange of the other of the plurality of unit sheets is larger than the part accommodation portion. Therefore, in the state where the flange of the part of the plurality of unit sheets is accommodated in the part accommodation portion, the flange of the other of the plurality of unit sheets is accommodated in the accommodation portion so as to cover the part of the plurality of unit sheets and the part accommodation portion.

In the display apparatus according to the present invention, the other of the plurality of unit sheets is located farthest from the light guide plate; and is accommodated in the accommodation portion so as to cover the part of the plurality of unit sheets and the part accommodation portion.

According to the present invention, the unit sheet in the optical sheet that is farthest from the light guide plate is accommodated in the accommodation portion so as to cover the part of the plurality of unit sheets and the part accommodation portion.

In the display apparatus according to the present invention, the part accommodation portion has a size, in a thickness direction of the optical sheet, that is smaller than, or equal to, a total thickness of the part of the plurality of unit sheets.

According to the present invention, the part accommodation portion is configured to have a size, in a thickness direction of the optical sheet, that is smaller than, or equal to, a total thickness of the part of the plurality of unit sheets.

In the display apparatus according to the present invention, the flange of the other of the plurality of unit sheets includes a light-blocking film.

According to the present invention, the flange of the other of the plurality of unit sheets uses the light-blocking film provided at a surface thereof facing the part of the plurality of unit sheets to block the light coming through the part of the plurality of unit sheets.

In the display apparatus according to the present invention, the holding member surrounds the optical sheet. The display apparatus includes a display panel on which light is incident via the optical sheet; and a support portion supporting the display panel, the support portion being included in the holding member and provided along the edge of the optical sheet. An edge region of the support portion facing the optical sheet is covered with the other of the plurality of unit sheets.

According to the present invention, the edge region of the support portion facing the optical sheet is covered with the other of the plurality of unit sheets. Therefore, the gap between the part of the plurality of unit sheets and the holding member is covered with the other of the plurality of unit sheets.

Advantageous Effects of Invention

The present invention prevents the luminance at the liquid crystal panel from becoming uneven or the like due to light, coming through a light guide plate, leaking through a gap between an optical sheet and a holding member.

DESCRIPTION OF EMBODIMENTS

Hereinafter, a display apparatus in an embodiment according to the present invention will be described in detail with reference to the drawings by way of an example in which the display apparatus is applied to a so-called liquid crystal TV receiver including a liquid crystal panel.

Embodiment 1

Figure 1:
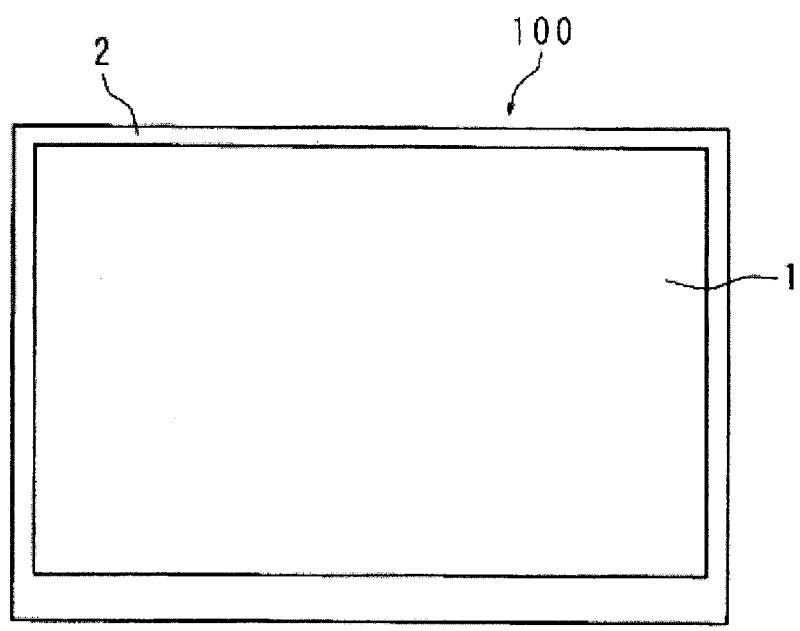
FIG. 1 is a front view showing an external appearance of a liquid crystal TV receiver in embodiment 1.

FIG. 1 is a front view showing an external appearance of a liquid crystal TV receiver 100 in embodiment 1. In the liquid crystal TV receiver 100, a liquid crystal display panel 1 and other components are accommodated in a bezel 2 and a backlight chassis 6 described below.

Figure 2:
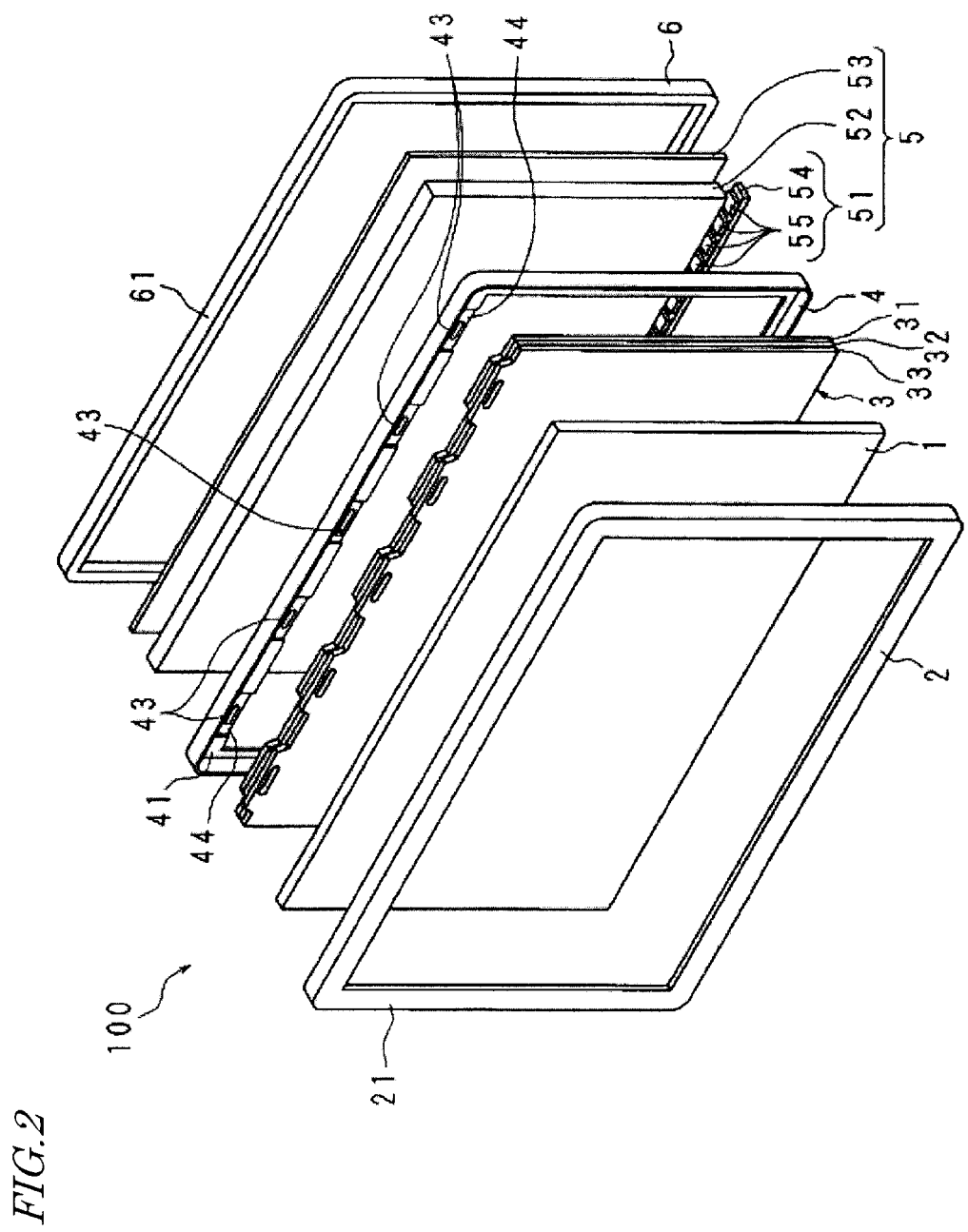
FIG. 2 is an exploded perspective view schematically showing a part of the liquid crystal TV receiver in embodiment 1.

FIG. 2 is an exploded perspective view schematically showing a part of the liquid crystal TV receiver 100 in embodiment 1.

As shown in FIG. 1, the liquid crystal TV receiver 100 in this embodiment includes the liquid crystal display panel 1, which is rectangular, at a surface thereof. The liquid crystal display panel 1 displays images on a front surface thereof. An optical sheet 3, a holding member 4, a light source device 5 and the backlight chassis 6 are provided in this order to the rear of the liquid crystal display panel 1. The light source device 5 includes a light source 51, a light guide plate 52 and a reflective sheet 53.

The light source device 5 is accommodated in the backlight chassis 6, which has a shape of a cuboid box with one side open. A peripheral edge of the optical sheet 3 and a side wall of the backlight chassis 6 are surrounded by the bezel 2, which is rectangular frame-shaped.

The optical sheet 3 is provided such that one surface thereof faces the other surface of the liquid crystal display panel 1. The light guide plate 52 is provided such that one surface thereof faces the other surface of the optical sheet 3.

The reflective sheet 53 is provided such that one surface thereof faces the other surface of the light guide plate 52.

The bezel 2 is a rectangular frame. The bezel 2 includes a rectangular tubular side plate and a loop-shaped frame portion 21 extending inward from one end of the side plate. The bezel 2 has an L-shaped cross section in a thickness direction of the liquid crystal TV receiver 100. The frame portion 21 of the bezel 2 is located to the front of the liquid crystal display panel 1. In other words, a peripheral edge region of the one surface of the liquid crystal display panel 1 is covered with the frame portion 21 of the bezel 2. A user may visually recognize an image displayed on the one surface of the liquid crystal display panel 1 via the frame portion 21.

The liquid crystal display panel 1 is a display panel and has a rectangular flat-plate shape. The liquid crystal display panel 1 adopts an active matrix system. The liquid crystal display panel 1 includes a polarizer (not shown) on the other surface thereof. The liquid crystal display panel 1 is configured to use the polarizer to divide incident light into a P wave (horizontally polarized component) and an S wave (vertically polarized component) such that only the P wave is directed toward the one surface while the S wave is absorbed by the polarizer. The liquid crystal display panel 1 may be, for example, an electrophoretic liquid crystal panel.

The optical sheet 3 provided on the other surface of the liquid crystal display panel 1 is a known component that, for example, diffuses or collects light which is emitted from the light source 51 and enters into the optical sheet 3 via the light guide plate 52, and that directs more uniform light toward the liquid crystal display panel 1. The optical sheet 3 includes, for example, three stacking unit sheets 31, 32 and 33. In more detail, the optical sheet 3 includes two diffusion sheets 31 and 33 and one prism sheet 32. The prism sheet 32 is sandwiched between the two diffusion sheets 31 and 33. The diffusion sheet 31, the prism sheet 32 and the diffusion sheet 33 have the same rectangular shape of the same size.

Of the two diffusion sheets 31 and 33, the diffusion sheet 31 provided to face the light guide plate 52 is an optical sheet that diffuses the light which enters into the diffusion sheet 31 from the light source 51 via the light guide plate 52 and that causes the light to enter into the prism sheet 32. The prism sheet 32 is an optical sheet that collects the light which enters into the prism sheet 32 via the diffusion sheet 31 and that directs the light toward the diffusion sheet 33. The light transmitted through the prism sheet 32 enters into the diffusion sheet 33 perpendicularly to the prims sheet 32.

The diffusion sheet 33 provided to face the liquid crystal display panel 1 is an optical sheet that further diffuses the light which enters into the diffusion sheet 33 via the prism sheet 32 such that the light has a more uniform luminance distribution, and that directs the light toward the other surface of the liquid crystal display panel 1. Hereinafter, the diffusion sheets 31 and 33 and the prism sheet 32 may also be referred to collectively as the optical sheet 3 for the sake of illustration.

Figure 3:
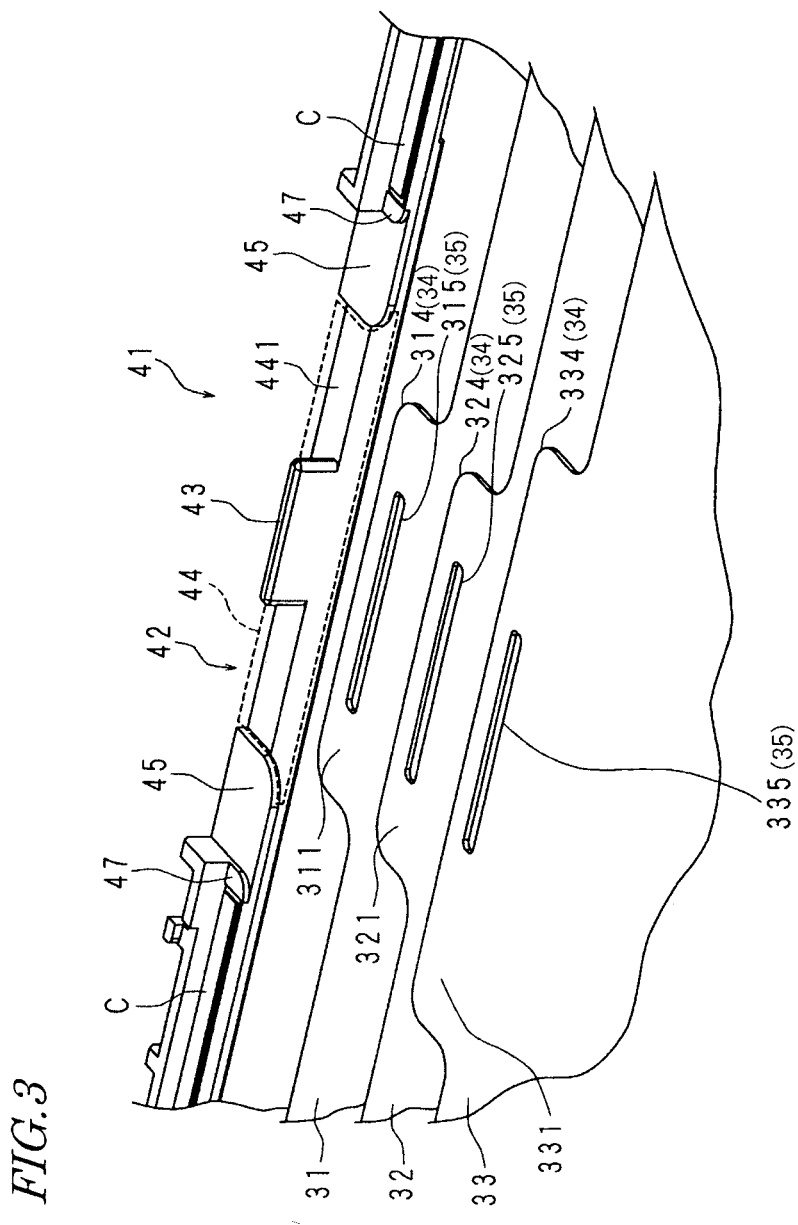
FIG. 3 is a perspective view illustrating a structure of an optical sheet and a holding member in the liquid crystal TV receiver in embodiment 1.
Figure 4:
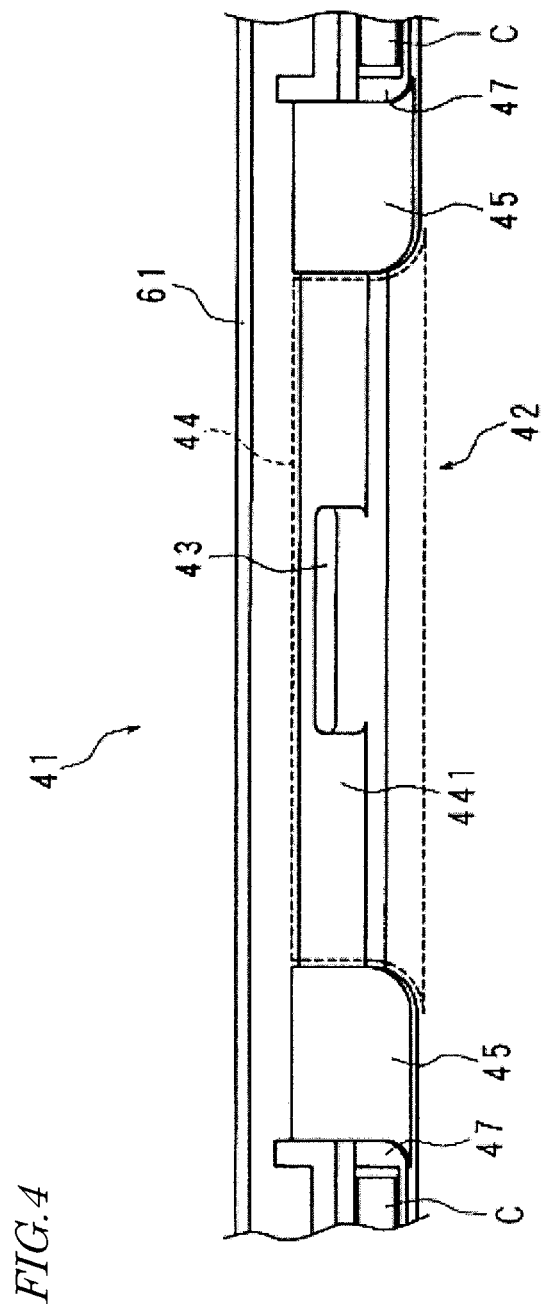
FIG. 4 is a perspective view illustrating the holding member in the liquid crystal TV receiver in embodiment 1.

FIG. 3 is a perspective view illustrating a structure of the optical sheet 3 and the holding member 4 in the liquid crystal TV receiver 100 in embodiment 1. FIG. 4 is a perspective view illustrating the holding member 4 in the liquid crystal TV receiver 100 in this embodiment.

The optical sheet 3 includes five engageable flanges along one longer side thereof. In more detail, the diffusion sheet 31 includes engageable flanges 314 extending in its plane from an edge of the one longer side. The diffusion sheet 33 ("the other of the plurality of unit sheets") includes engageable flanges 334 extending in its plane from an edge of the one longer side. The prims sheet 32 includes engageable flanges 324 extending in its plane from an edge of the one longer side. Hereinafter, the engageable flanges 314, 324 and 334 may be referred to also as the "engageable flanges 34".

The engageable flanges 314, 324 and 334 are used for engagement of the holding member 4 and the optical sheet 3. The engageable flanges 314, 324 and 334 are rectangular, and each have an engageable hole, usable for the engagement with the holding member 4, formed therein. In more detail, the engageable flanges 314 each have an engageable hole 315 formed therein. The engageable flanges 324 each have an engageable hole 325 formed therein. The engageable flanges 334 each have an engageable hole 335 formed therein. For example, the engageable holes 315, 325 and 335 each have a strip shape longer in a longitudinal direction of the optical sheet 3. Hereinafter, the engageable holes 315, 325 and 335 may be referred to also as the "engageable holes 35".

One engageable flange 34 is provided at a center of the optical sheet 3 in a direction along the one longer side, and two engageable flanges 34 are provided to each of two sides of the engageable flange 34 at the center. The engageable flanges 34 are provided at the same interval.

The holding member 4 holding the optical sheet 3 is provided to be closer to the other surface (surface facing the light guide plate 52) of the optical sheet 3 in the vicinity of the peripheral edge region of the other surface of the optical sheet 3. The holding member 4 is engaged with the optical sheet 3 and thus holds the optical sheet 3 such that the optical sheet 3 faces the liquid crystal display panel 1.

The holding member 4 includes a hollow rectangular holding frame 41 surrounding the edge of the optical sheet 3. A side wall 61 of the backlight chassis 6 is arranged to locate outside an outer peripheral edge of the holding frame 41. An opening of the holding frame 41 is smaller than the one surface of the light guide plate 52.

Accommodation portions 42 each accommodating the engageable flanges 314, 324 and 334 are formed in one surface, of the holding frame 41, facing the liquid crystal display panel 1. The accommodation portions 42 each include a part accommodation portion 44 accommodating a part of the engageable flanges 314, 324 and 334. The part accommodation portion 44 includes a recessed portion 441 formed as extending in a longitudinal direction of the holding frame 41. An engageable protrusion 43 is provided at a center of the recessed portion 441 in the longitudinal direction, along an edge, of the recessed portion 441, closer to the optical sheet 3. From the one longer side of the optical sheet 3, five, for example, engageable protrusions 43 protrude in a thickness direction of the optical sheet 3. The engageable protrusions 43 are provided corresponding to the engageable holes 315, 325 and 335 in the engageable flanges 314, 324 and 334. Thus, the optical sheet 3 is held by the holding member 4 by the engagement of the engageable protrusions 43 and the engageable holes 315, 325 and 335.

The recessed portion 441 has a strip shape extending in the longitudinal direction of the holding frame 41. The recessed portion 441 has a size in the thickness direction of the optical sheet 3 (hereinafter, referred to as a "depth") that is smaller than, or equal to, a sum of a thickness of the engageable flange 314 and a thickness of the engageable flange 324.

Guides 45 guiding the engageable flanges 314 and 324 such that the engageable flanges 314 and 324 are accommodated are provided respectively at two ends of the recessed portion 441 in the longitudinal direction. The guides 45 are plate-like, and each partially protrude toward the optical sheet 3 from the recessed portion 441. Both of two ends of the engageable flange 334 in the longitudinal direction are placed on the guides 45.

The above-described structure may be summarized as follows. The accommodation portions 42 each include the part accommodation portion 44 and the guides 45. The part accommodation portion 44 has a shape that is conformed to the shape of the engageable flanges 314 and 324 and is defined by the recessed portion 441 and an edge of each of the guides 45. The present invention is not limited to this. The part accommodation portion 44 may have a shape different from the shape of the engageable flanges 314 and 324.

The holding member 4 includes support portions 47 supporting the liquid crystal display panel 1. Each of the support portions 47 is strip-shaped, and is provided in contact with an end, of the corresponding guide 45, farther from the engageable protrusion 43 in the longitudinal direction of the holding frame 41. Each support portion 47 is provided such that a side surface thereof facing the optical sheet 3 is flush with a side surface of the guide 45.

A size of the guide 45 in the thickness direction of the optical sheet 3 and a size of the support portion 47 in the thickness direction of the optical sheet 3 have a difference equal to a thickness of the engageable flange 334. In other words, there is a step between the guide 45 and the support portion 47 that is equal to the thickness of the engageable flange 334.

The support portion 47 is provided with a cushion C. The cushion C has a shape conforming to the shape of the support portion 47, and is located at a position away from an edge of the support portion 47 facing the optical sheet 3 by a predetermined gap. The liquid crystal display panel 1 is placed on the cushion C, and thus the support portion 47 supports the liquid crystal display panel 1 such that the liquid crystal display panel 1 is in contact with, or out of contact with, the optical sheet 3.

The step having a size equal to the thickness of the engageable flange 334 is provided between the guide 45 and the support portion 47. Therefore, in the state where the engageable flange 334 is placed on the guide 45, one surface 331 of the engageable flange 334 and the support portion 47 (cushion C) are at substantially the same level in the thickness direction of the optical sheet 3. Thus, in the state where the liquid crystal display panel 1 is supported by the support portion 47 (cushion C), there is no gap between the liquid crystal display panel 1 and the engageable flange 334, which decreases the thickness of the liquid crystal TV receiver 100.

The light guide plate 52, which is rectangular, is arranged to face the other surface of the optical sheet 3. Namely, the one surface of the light guide plate 52 is configured to face the other surface of the optical sheet 3. The light guide plate 52 diffuses the light emitted from the light source 51 and incident on one side surface thereof, and the light guide plate 52 directs the light from the one surface thereof toward the optical sheet 3.

The light guide plate 52 is formed of, for example, a transparent plate-like material (glass, acrylic resin, polycarbonate resin or the like). In the case where the light source includes point light sources such as LEDs or the like, the light guide plate 52 diffuses light from each of the point light sources and directs the light from the one surface as uniform planar light.

The reflective sheet 53 is, for example, rectangular, and is provided such that the one surface thereof faces the other surface of the light guide plate 52. The reflective sheet 53 returns light directed from the other surface of the light guide plate 52 to the light guide plate 52.

The light source 51 is provided to face the one side surface of the light guide plate 52. The light source 51 includes, for example, a plurality of light emitting diodes (LEDs) 55 mounted on a substrate 54.

Figure 5:
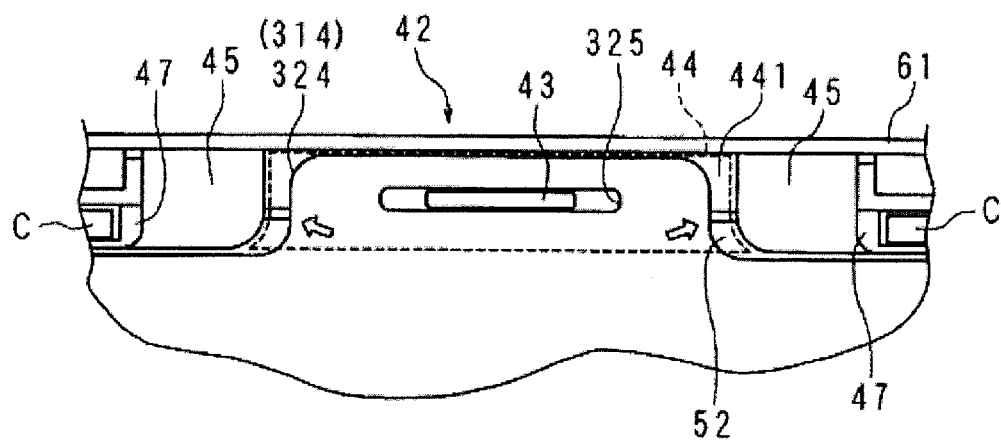
FIG. 5 illustrates the engagement of the optical sheet and the holding member in the liquid crystal TV receiver in embodiment 1.
Figure 6:
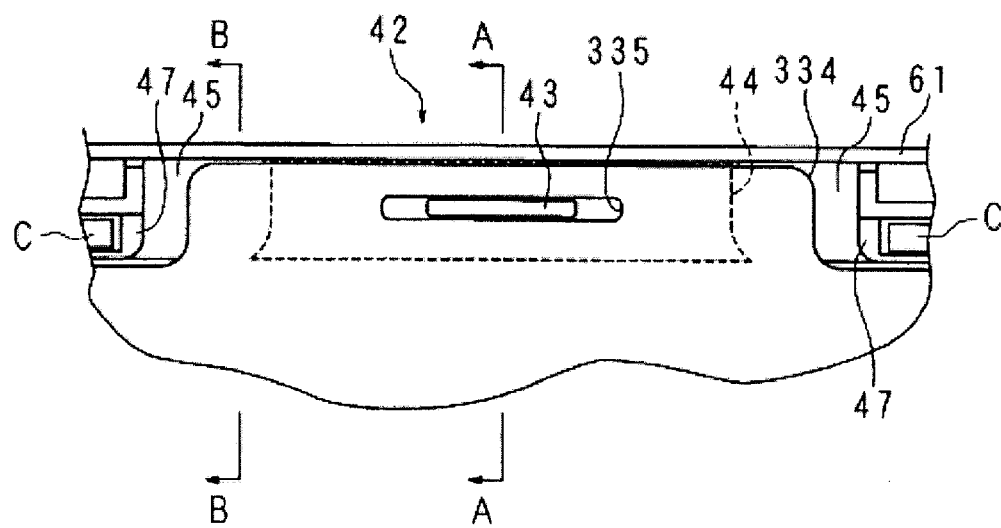
FIG. 6 illustrates the engagement of the optical sheet and the holding member in the liquid crystal TV receiver in embodiment 1.

FIG. 5 and FIG. 6 each illustrate the engagement of the optical sheet 3 and the holding member 4 in the liquid crystal TV receiver 100 in embodiment 1. In more detail, FIG. 5 shows the engagement of the engageable flanges 314 and 324 with the holding member 4. FIG. 6 shows a state where the engageable flange 334 is further engaged.

Figure 7:
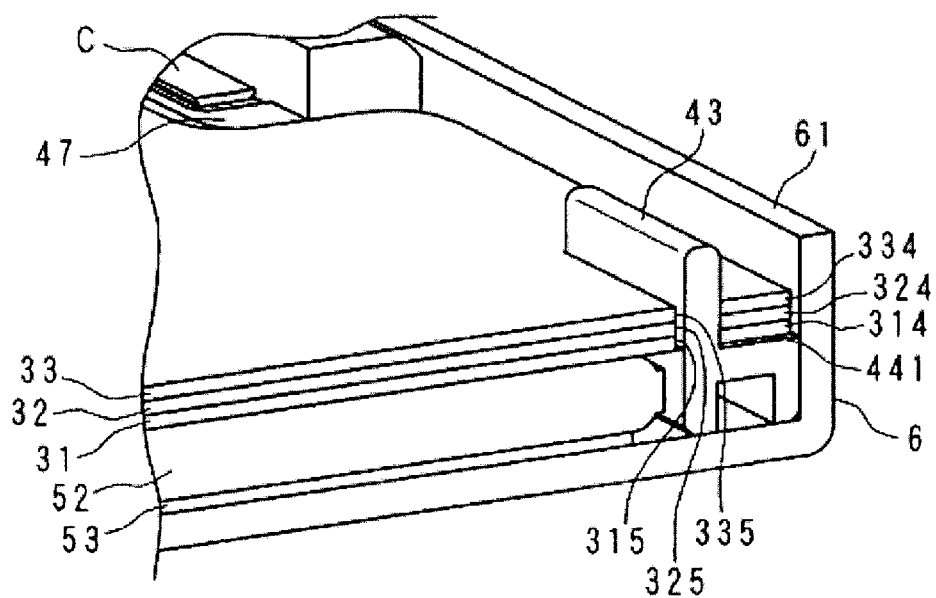
FIG. 7 is a perspective view showing a cross section taken along line A-A in FIG. 6.
Figure 8:
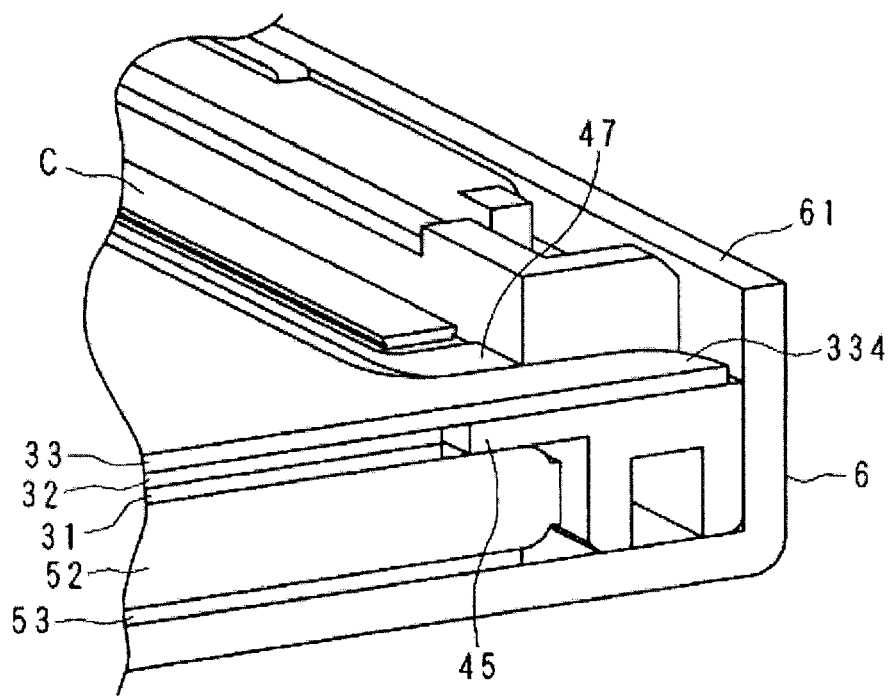
FIG. 8 is a perspective view showing a cross section taken along line B-B in FIG. 6.

FIG. 7 is a perspective view showing a cross section taken along line A-A in FIG. 6. FIG. 8 is a perspective view showing a cross section taken along line B-B in FIG. 6.

The optical sheet 3 is held by the holding member 4 so as to cover the opening of the holding frame 41 of the holding member 4.

Namely, in the state where the engageable flanges 34 of the optical sheet 3 are in contact with the one surface of the holding frame 41 of the holding member 4, the engageable holes 35 in the engageable flanges 34 of the optical sheet 3 are engaged with the engageable protrusions 43. As a result, the holding member 4 positions and holds the optical sheet 3. In more detail, the three engageable holes 315, 325 and 335 are engaged with one engageable protrusion 43. The engageable flange 314 is closest to, and the engageable flange 334 is farthest from, the light guide plate 52.

In the meantime, as described above, only the engageable flanges 314 and 324 are placed in the part accommodation portion 44, and the engageable flange 334 is placed on the engageable flange 324 and the guides 45.

In more detail, the engageable flanges 314 and 324 are guided by the guides 45 and placed in the recessed portion 441 of the part accommodation portion 44. First, the engageable flange 314 is placed in the recessed portion 441 while being supported by the light guide plate 52 and engaged with the engageable protrusion 43. Next, the engageable flange 324 is placed on one surface 311 of the engageable flange 314 while being engaged with the engageable protrusion 43 (see FIG. 5).

In such a structure in which the optical sheet 3 (engageable flanges 314 of diffusion sheet 31) is in contact with, and is supported by, the light guide plate 52, no component is provided between the light guide plate 52 and the optical sheet 3 (engageable flanges 314 of diffusion sheet 31). Thus, the thickness of the liquid crystal TV receiver 100 is decreased.

The optical sheet 3 is thermally expanded by heat generated by the light source. In order to deal with the thermal expansion, it is necessary that the part accommodation portion 44 should be larger than the engageable flanges 314 and 324 in the plane of the optical sheet 3. In more detail, predetermined gaps need to be provided between the engageable flanges 314 and 324 and the guides 45 (see the white arrows in FIG. 5).

However, in the case where such gaps are provided, light from the light guide plate 52 may undesirably leak through the gaps. This will be described more specifically. Light coming through the light guide plate 52 should be incident on the liquid crystal display panel 1 via the optical sheet 3. However, in the above-described structure proposed to decrease the thickness, the light coming through the light guide plate 52 may undesirably pass the gaps to be incident directly on the liquid crystal display panel 1, which may cause luminance unevenness or the like at the liquid crystal display panel 1.

By contrast, in the liquid crystal TV receiver 100 in embodiment 1, the engageable flange 334 has a size larger than the size of the engageable flanges 314 and 324 and the part accommodation portion 44 as seen in the thickness direction of the optical sheet 3, and is accommodated in the accommodation portion 42 so as to cover the engageable flanges 314 and 324 and the part accommodation portion 44. In this manner, the above-described problem is prevented. This will be described in detail below.

The engageable flange 334 is placed on one surface 321 of the engageable flange 324 so as to cover the engageable flanges 314 and 324 and the part accommodation portion 44, while being engaged with the engageable protrusion 43. In this step, both of the two ends, in the longitudinal direction, of the engageable flange 334 are placed on the guides 45.

As described above, the engageable flange 334 is larger than the engageable flanges 314 and 324 and the part accommodation portion 44. Therefore, in the state where the engageable flange 334 is placed as described above, the gaps between the engageable flanges 314 and 324 and the guides 45 are closed by the engageable flange 334 (see FIG. 6).

Therefore, the light from the light guide plate 52 does not leak through the gaps, and luminance unevenness or the like is prevented from being caused at the liquid crystal display panel 1.

In the above-described example, the engageable flange 334 is larger than the engageable flanges 314 and 324 and the part accommodation portion 44 as seen in the thickness direction of the optical sheet 3. The present invention is not limited to this. The engageable flange 324 may be larger than the engageable flanges 314 and 334 and the part accommodation portion 44.

As described above, the part accommodation portion 44 has a depth smaller than, or equal to, the sum of the thickness of the engageable flange 314 and the thickness of the engageable flange 324. Therefore, in the state where the engageable flange 334 is placed on the guides 45 while being in contact with the engageable flange 324, no gap is provided between the engageable flange 324 and the engageable flange 334.

Embodiment 2

In embodiment 1, the engageable flange 334 is larger than the engageable flanges 314 and 324 and the part accommodation portion 44, and is accommodated in the accommodation portion 42 so as to cover the engageable flanges 314 and 324 and the part accommodation portion 44. The present invention is not limited to this.

Figure 9:
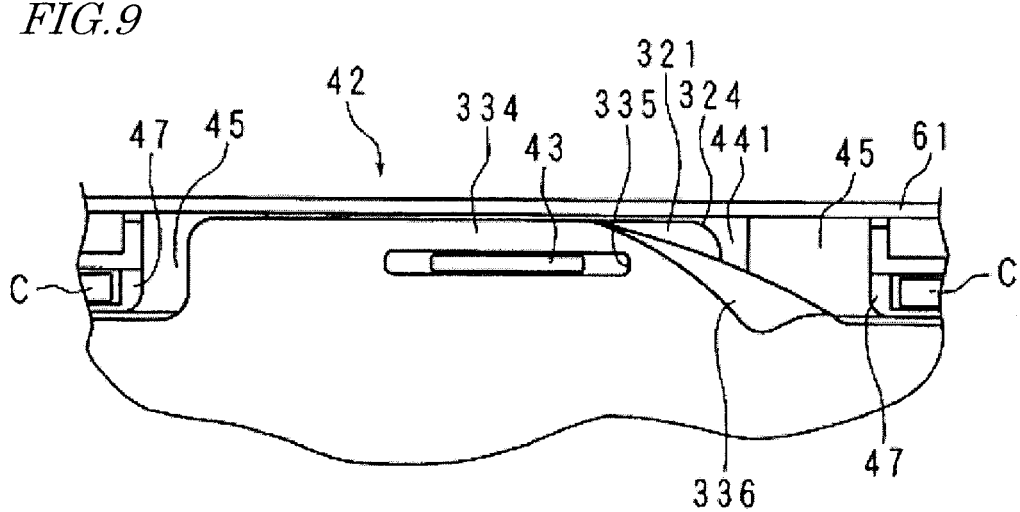
FIG. 9 illustrates a structure of an engageable flange in a liquid crystal TV receiver in embodiment 2.

FIG. 9 illustrates a structure of the engageable flange 334 in a liquid crystal TV receiver 100 in embodiment 2.

In embodiment 2, the engageable flange 334 includes a light-blocking film. In more detail, in the state where the engageable flange 334 is accommodated in the accommodation portion 42, the other surface of the engageable flange 334 faces and is in contact with one surface 321 of the engageable flange 324. A light-blocking film 336, which blocks light, is applied at the other surface of the engageable flange 334.

Therefore, even if light directed from the light guide plate 52 passes the gaps between the engageable flanges 314 and 324 and the guides 45, the light is prevented by the light-blocking film 336 from advancing toward the liquid crystal display panel 1.

In the above-described example, the light-blocking film is provided at the other surface of the engageable flange 334.

The present invention is not limited to this. The light-blocking film may be provided at the one surface 331 of the engageable flange 334.

In this case, the engageable flange 334 closes the gaps between the engageable flanges 314 and 324 and the guides 45, and thus the light from the light guide plate 52 does not leak through the gaps. The light-blocking film 336 blocks the light from advancing toward the liquid crystal display panel 1. Thus, luminance unevenness or the like is prevented with more certainty from being caused at the liquid crystal display panel 1.

In the above-described example, the engageable flange 334 includes the light-blocking film. The present invention is not limited to this. For example, the engageable flange 334 may include a reflective film.

Embodiment 3

Figure 10:
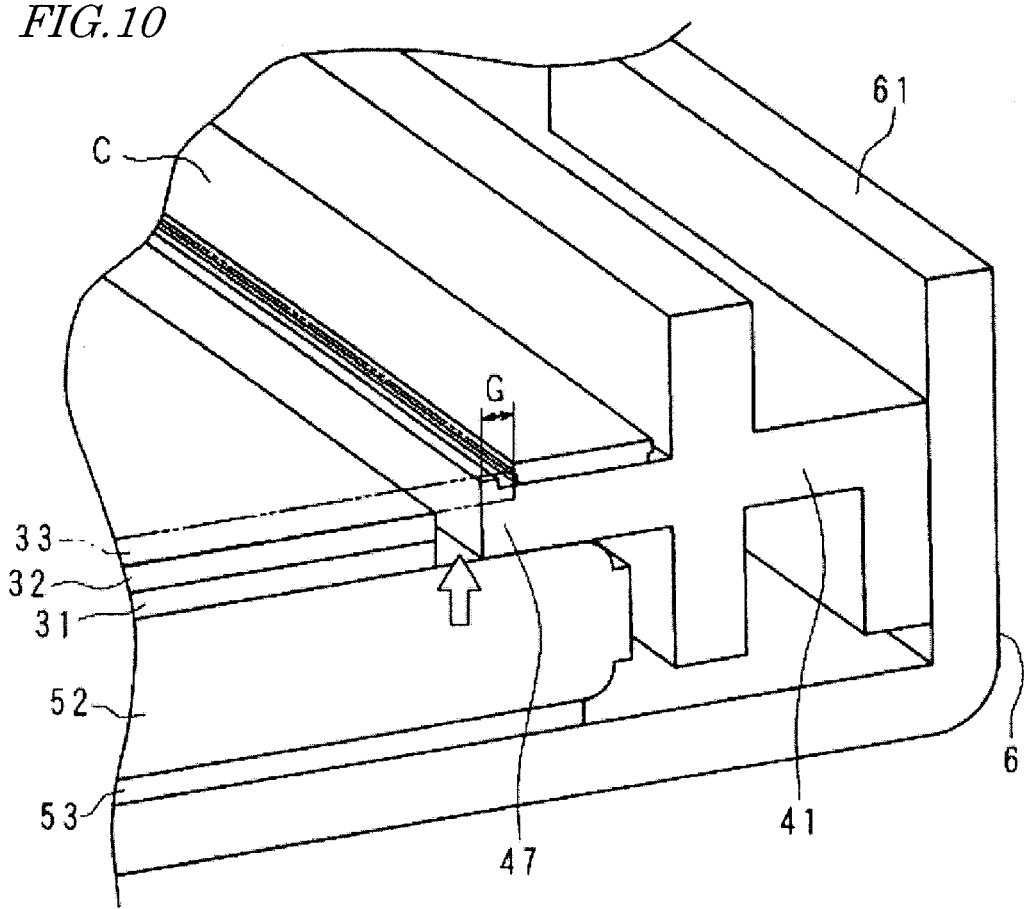
FIG. 10 illustrates a structure of a diffusion sheet in a liquid crystal TV receiver in embodiment 3.

FIG. 10 illustrates a structure of the diffusion sheet 33 in a liquid crystal TV receiver 100 in embodiment 3.

As described above, the holding member 4 (holding frame 41) is provided so as to surround the edge of the optical sheet 3. The holding member 4 holds the optical sheet by the engagement of the engageable holes 35 in the engageable flanges 34 and the engageable protrusions 43 on the holding frame 41.

The optical sheet 3 is thermally expanded by the heat generated by the light source. In order to deal with the thermal expansion, it is needed to provide a predetermined gap between the optical sheet 3 and the holding frame 41 (see the white arrow in FIG. 10).

However, in the case where the gap is provided between the optical sheet 3 and the holding frame 41, light from the light guide plate 52 may undesirably leak through the gap. Namely, the light from the light guide plate 52 may undesirably pass the gap to be directly incident on the liquid crystal display panel 1, which may cause luminance unevenness or the like at the liquid crystal display panel 1.

The liquid crystal TV receiver 100 in embodiment 3 is configured to deal with such a problem. This will be described in detail below.

As described above, the holding member 4 includes the support portions 47 each having a strip shape. The support portions 47 are each provided in contact with one end, of the corresponding guide 45, farther from the engageable protrusion 43 in the longitudinal direction of the holding frame 41. The support portion 47 is provided with the cushion C located at a position away from the edge of the support portion 47 facing the optical sheet 3 by a predetermined gap G.

In the meantime, the diffusion sheet 33 in the optical sheet 3 is larger than the diffusion sheet 31 and also the prism sheet 32. In more detail, the diffusion sheet 33 is configured such that an edge region thereof extends to a region of the support portion 47 corresponding to distance G (see the two-dot chain line in FIG. 10). Namely, the edge region of the diffusion sheet 33 covers the gap between the support portion 47 and the prism sheet 32/the diffusion sheet 31, and a part of the support portion 47 facing the optical sheet 3.

Therefore, the light from the light guide plate 52 does not leak through the gap between the optical sheet 3 and the holding frame 41. Luminance unevenness or the like is prevented from being caused at the liquid crystal display panel 1.

REFERENCE SIGNS LIST

1 Liquid crystal display panel
3 Optical sheet
4 Holding member
31, 33 Diffusion sheet
32 Prism sheet
34 Engageable flange
42 Accommodation portion
44 Part accommodation portion
47 Support
52 Light guide plate
100 Liquid crystal TV receiver
314, 324, 334 Engageable flange

The invention claimed is:

1. A display apparatus, comprising:
an optical sheet placed on a light guide plate, the optical sheet including a flange extending in a plane thereof from an edge thereof; and
a holding member including an accommodation portion accommodating the flange, the holding member holding the optical sheet;
wherein:
the optical sheet has an engageable hole formed in the flange to engage the optical sheet with the holding member; and
the holding member has an engageable protrusion corresponding to the engageable hole;
the optical sheet further includes a plurality of unit sheets;
the accommodation portion includes a part accommodation portion accommodating the flange of a part of the plurality of unit sheets; and
the flange of the rest of the plurality of unit sheets other than the part of the plurality of unit sheets is larger than the part accommodation portion.

2. The display apparatus according to claim 1, wherein:
the rest of the plurality of unit sheets is located farthest from the light guide plate; and
the flange of the rest of the plurality of unit sheets is accommodated in the accommodation portion so as to cover the flange of the part of the plurality of unit sheets and the part accommodation portion.

3. The display apparatus according to claim 1, wherein the part accommodation portion has a size, in a thickness direction of the optical sheet, that is smaller than, or equal to, a total thickness of the part of the plurality of unit sheets.

4. The display apparatus according to claim 2, wherein the flange of the rest of the plurality of unit sheets includes a light-blocking film.

5. The display apparatus according to claim 1, wherein:
the holding member surrounds the optical sheet;
the display apparatus includes:
a display panel which is illuminated with light via the optical sheet; and
a support portion supporting the display panel, the support portion being included in the holding member and provided along the edge of the optical sheet; and
an edge region of the support portion facing the optical sheet is covered with the rest of the plurality of unit sheets.

6. The display apparatus according to claim 1, wherein:
the holding member surrounds the optical sheet;
the display apparatus includes:
a display panel which is illuminated with light via the optical sheet; and
a support portion supporting the display panel, the support portion being included in the holding member and provided along the edge of the optical sheet; and the flange of the rest of the plurality of unit sheets does not overlap with the support portion when viewed in a direction normal to the display panel.

* * * * *